United States Patent Office 3,213,044
Patented Oct. 19, 1965

3,213,044
PROCESS OF PREPARING A RESINOUS MICRO-CAPILLARY BODY AND PRODUCT OBTAINED THEREFROM
Herman B. Wagner, Blooming Glen, Pa.
(R.F.D. 3, Perkasie, Pa.)
No Drawing. Filed Jan. 22, 1957, Ser. No. 635,144
15 Claims. (Cl. 260—2.5)

For so much of the subject matter that is common to this application and my prior abandoned application, Serial No. 542,083, filed October 12, 1955, I claim the benefit of that application.

This invention relates to solid state substances characterized by a very fine, micro-capillary, porous internal structure, and to new methods that I have devised for the manufacture of such substances.

It is well recognized that certain substances possessing fine, porous structures possess absorptive properties. Examples of such substances previously known include some naturally occurring, and some of synthetic origin. An example of the former is diatomaceous earth, while examples of the latter are such substances as activated charcoal, the gel of silicic acid, and the various, synthetic ion-exchanging resins.

With some of these, such as diatomaceous earth, activated charcoal, and the gel of silicic acid, the absorptive properties are most pronounced with non-ionic substances, such as water, alcohols, hydrocarbons, and the like, and this absorption is essentially physical in nature. With others, such as the ion-exchanging resins, absorptive properties are exhibited also toward ionized substances such as sodium chloride, or copper sulfate, or the component ions of these and other ionic compounds, in aqueous solution. With this latter type of ionic absorption the phenomenon is not only physical but also chemical in nature.

The diverse, practical applications and utility, of materials possessing such absorptive properties is well established. Control of relative humidity, drying processes, purification and analytical processes, are only a few among many areas where such substances have been effectively employed.

It is an object of the present invention to provide substances, additional to those previously known, and possessing absorptive properties such as the aforementioned.

It is another object of the invention to provide new methods for manufacture of such absorptive substances.

It is still another object of the invention to provide new methods permitting of much more variability and latitude in determining the chemical characteristics of the absorbing substances than is inherent in other, previously known methods of manufacture.

Further objects and advantages of the invention will become apparent upon reference to the appended claims and detailed specification.

The general procedure employed in making my new absorptive substances is as follows:

First, I select a solid, parent substance, hereinafter referred to as a matrix; the matrix possesses a porous internal structure which itself is characterized as suitable for absorptive purposes.

Second, I saturate the matrix with a fluid substance capable of conversion to a permanently solid state. The liquid will be referred to as a casting liquid and upon conversion it will be referred to as a cast body or a casting.

Third, I dissolve the matrix in a solvent which is a solvent for the matrix but in which the cast body is not appreciably soluble.

As a consequence of these operations, that space which was initially void space in the parent matrix becomes filled with the casting liquid. The subsequent conversion of the casting liquid to solid form provides a solid replica following the geometrical pattern of the internal, initially void space of the matrix. When the matrix is then dissolved by the solvent, a new void space is thus produced, this space constituting the internal void structure of the new material. Thus, there is produced a new, porous, capillary-containing substance, with its own associated chemical characteristics and absorptive properties, replacing the parent matrix substance.

The absorptive properties of a substance are often related to the chemical nature of the substance. Since it is possible, by the selection of the casting liquid from which the cast body is derived to determine the chemical behavior of the cast body, it follows that the absorptive properties of the finished cast body may be the subject of wide variation. Heretofore, the selection of absorptive substances has been severely limited to those substances which naturally possess the desired qualities or could be prepared in a form possessing such properties. My process makes it possible to prepare additional absorptive substances with chemical properties not heretofore available in the desired physical form. Even more important, it affords the worker in the art with the opportunity of making a selection of chemical properties and a selection of physical properties so that the absorptive casting will have the optimum combination of chemical properties and physical form to carry out his desired object.

The following examples are illustrative of the invention but it is to be understood that the invention is not confined thereto:

*Example I*

To 9.9 grams of liquid, epoxide type resin (Shell Chemical Corporation Epon resin 562) is added 0.75 gram of diethylene triamine. The solution thus obtained was stirred immediately with 10 grams of dry, 8 to 10 mesh, silica gel. This had been prepared by crushing, screening, and drying at 150° C., Davison Chemical Corporation silica gel No. 70. This silica gel contains relatively large diameter capillaries (averaging about 100 Angstrom units in diameter) and contains about 0.8 ml. of pore volume per gram of silica gel. The amount of liquid resin used here, was calculated to fill the pore volume (8.0 ml.) contained in the 10 grams of silica gel, the density of the epoxide resin being about 1.23 grams per ml.

Epoxide type resins are obtained as the condensation products of epichlorohydrin and diphenylol propane. The molecular weight of such resin ranges from 400 to 8000, depending upon the degree of polymerization. The resin used in this example has a molecular weight of about 400 and a viscosity of 135 centipoises at 25° C.

After stirring the liquid resin for 15 minutes with the silica gel particles, it was apparent that essentially all of the resin had entered the silica gel. The slight excess liquid was wiped from the surface of the silica gel particles by gently rolling these between pieces of absorbent paper, so that a visually dry gel surface was obtained.

The resin-saturated silica gel particles were then allowed to stand at room temperature (27° C.) for 30 minutes, in order to allow the initial stage of polymerization of the resin to progress. Following this, the material was placed in an oven at a temperature of 75° C., for 1½ hours so that further polymerization and solidification of the resinous substance would occur. At the end of this period the material was removed from the oven and allowed to cool to room temperature.

The resin-containing silica gel particles were then placed in a 150 ml. volume of a 24% solution, by weight, of hydrofluoric acid in water. Reaction commenced at room temperature, and within 15 minutes, the siliceous portion of the mass was dissolved, leaving a resinous, solid residue, retaining the shape of the parent gel particles.

This mass of discrete, resinous particles was then washed with six successive 150 ml. portions of distilled water and then dried for 3 hours at 75° C. The weight of dry, resinous product thus obtained was 9.7 grams.

Aliquot 1 gram portions of this material were then placed for several days within humidity chambers wherein a temperature of 25° C. and a relative humidity value, as tabulated below, were maintained. The weight gains shown below, as a percentage of the initial weight of the dry material, indicate the absorptive properties of the material.

| Relative humidity: | Percentage weight gain due to absorbed water |
|---|---|
| 100% | 48 |
| 81% | 26 |
| 51% | 6.9 |

The volume of water absorbed at a relative humidity of 100% is a measure of the total pore volume of the substance and was measured here as 0.48 ml. per gram of resinous substance. A calculation of this value can be made independently, on a theoretical basis, from the concept that this void space in the resinous material corresponds to the solid space in the parent silica gel particles. Thus: 1 gram of the liquid epoxide resin, of density equal to 1.23 grams per ml., occupies a volume of 1.00/1.23, or 0.81 ml. Since the silica gel particles contained 0.8 ml. per gram of silica, the resinous material was then originally contained in 0.81/0.8 or 1.01 grams of silica gel. Taking a value of 2.2 grams per ml. as the approximate density of solid silica, gives a value of 1.01/2.2, or 0.46 ml. as the volume of this weight of solid silica. Since this solid silica corresponds, as indicated above, to the void space of the resinous, absorbing material, a value of 0.46 ml. of pore space per gram of resinous material is calculated. The percent of void space in this material is slightly more than 35%. However silica gel matrices having a pore volume as low as 0.20 ml.:gram silica gel have been utilized, and these yielded absorptive resinous materials having a void space of 70%.

*Example II*

2.0 grams of diethylene triamine were dissolved in 20.0 grams of the liquid epoxide resin noted in Example I. This corresponds to a greater ratio of amine to resin than was employed in Example I.

This solution was then stirred immediately with 15 grams of the 8 to 10 mesh silica gel. Stirring was continued for 25 minutes and during this time the temperature of the mass rose from an initial value of 29° C. to a maximum temperature of about 50° C. The small amount of surface liquid was then removed by rolling on cotton cloth, and the particles then baked for 45 minutes at 105° C.

After cooling to room temperature the siliceous portion was dissolved by placing the particles for 26 minutes in 200 ml. of a 24% solution of hydrofluoric acid in water. The solution temperature, initially at 30° C. rose to a maximum of 60° C. The resinous particles remaining were then washed with 15 successive 150 ml. portions of distilled water and then dried for one hour at a temperature of 75° C., followed by 15 minutes additional drying at 115° C.

The water absorption measured for this material at 51% relative humidity was 8.9%, by weight.

When a 1 gram portion of this material was stirred with 10 ml. of a 1% copper sulfate solution, absorption of copper ion from the solution occurred rapidly; the originally colorless resinous particles assumed a pronounced blue color indicating absorption of copper ion, while the solution became less strongly colored. Upon decanting the aqueous, supernatant layer from the particles and washing several times with portions of distilled water, the strong blue color persisted in the resin particles, thus indicating the strong affinity of the substance for the copper ion. When, however, the resinous particles, now holding absorbed copper ions, was shaken with a 10 ml. portion of a 5% zinc sulfate solution the blue color of the resinous particles very nearly disappeared and the originally colorless zinc sulfate solution assumed a blue color, this indicating displacement of the copper ion and preferential absorption of the zinc ion by the resin.

*Example III*

The following solution was prepared:

16.0 grams of a solid epoxide resin (Shell Epon resin No. 1009)
5.8 grams of a 60% solution of urea-formaldehyde resin
9.0 grams of methyl ethyl ketone To this solution was added a catalyst solution:

0.2 gram para-toluene sulfonic acid
5.0 grams ethyl alcohol
4.0 grams methyl ketone The 40 grams of combined solution this obtained were stirred immediately and rapidly with 50 grams of the dry silica gel as described in Examples I and II and then allowed to stand at room temperature for several weeks' time. This period provided time for polymerization to occur and for evaporation of solvents to take place into the atmosphere. The purpose of the solvents above was to provide a composition fluent enough to allow flow of the polymeric epoxide and urea-formaldehyde materials into the silica gel capillaries.

The epoxy resin employed in this example is of the bisphenol A-epichlorhydrin type, has a melting point of 145–155° C. and a molecular weight of 6000–7000. A 40% solution in the solvent known as Butyl Carbitol has a viscosity of approximately 50 poises at 25° C. Its epoxide equivalent weight is about 3200 grams.

At the end of this period of room temperature drying the particles were dried for 1 hour at 80° C. A 10 gram portion was then dissolved in 200 grams of a 24% hydrofluoric acid solution, the temperature of the solution rising from an initial value of 30° C. to a maximum of 45° C. during a 30 minute period. After repeated washing with distilled water the resinous particles remaining were then dried for 18 hours at 80° C., and a total weight of 2.8 grams of resinous particles were obtained.

At a relative humidity of 81% these particles showed a water absorption of approximately 2%, this smaller value corresponding to the larger diameter pores in the cast body due to shrinkage during solvent evaporation.

*Example IV*

As a starting material, 25 grams of polyester resin "P–43" made by Rohm and Haas Company were taken. Polyester resins are formed by the condensation of saturated or unsaturated dibasic acids with polyhydric alcohols. The resin here employed is formed by the reaction of a dibasic aliphatic acid namely, maleic anhydride and a glycol namely, ethylene glycol, and is furnished as a 70% solution in styrene monomer. The 25 grams of starting solution was dissolved in an additional 14 grams of styrene monomer and to this solution were added successively 0.4 gram of methyl ethyl ketone peroxide catalyst and 0.64 gram of cobalt naphthenate accelerator. This solution was then stirred, immediately after addition of the catalyst and accelerator, with 48 grams of the dry silica gel described above, and then allowed to remain at room temperature for 1 hour. Following this the particles were baked for 30 minutes at a temperature of 75° C., and then for an additional 30 minutes at 105° C. After cooling to room temperature, the material was placed for 1 hour in 400 ml. of a 24% solution of hydrofluoric acid in water. During this time the solution temperature rose from 28° C., to a maximum of 60° C. The supernatant liquid was then decanted, the solid particles washed with 4 successive portions of distilled water and then placed in a fresh 400 ml. portion of 24% hydrofluoric acid for 16 hours. Following this the particles were washed with 10 successive 400 ml. portions of distilled water, then dried for 16 hours at 80° C. This material showed absorptive properties with water but exhibited no affinity toward ionic substances.

*Example V*

A quantity of 20 grams of activated alumina (8–10 mesh) was mixed with 2.5 grams of the epoxide resin used in Examples I and II, containing 0.35 gram of diethylene triamine. After approximately 10 minutes continuous stirring of this mass, it was spread out on a flat surface and baked for 85 minutes at 90–95° C. After cooling to room temperature, the material was placed in 300 ml. 8% sulfuric acid solution and stirred occasionally during a period of 2 hours. At the end of this time, the acid solution was decanted and the resinous particles washed with 6 successive 200 ml. portions of distilled water. The resinous particles were dried for 2 hours at 75° C. for a yield of 2.7 grams of absorbent.

*Example VI*

A 15 gram quantity of infusorial earth (200–300 mesh) was stirred into 12 grams of methyl methacrylate monomer containing 0.20 gram of benzoyl peroxide catalyst. The free flowing powder thus obtained was placed in a 100 ml. flask and heated for 45 minutes at 75° C., followed by heating for 90 minutes at 105° C. After cooling to room temperature, the mass of particles was placed in 200 ml. of 32% hydrofluoric acid for 12 hours. At the end of this time the resinous particles were washed with 8 200 ml. portions of distilled water and dried at 50° C. for 6 hours. A yield of 10.5 grams of absorbent was had.

Depending upon the physical characteristics desired in the finished casting, many matrix materials may be selected. Consideration must not only be given to the size of pores in the matrix; the relative size of the matrix body, which will be transformed into pores by the operation of my process, must also be considered.

In addition to diatomaceous earth, other natural matrix materials such as limonite and pumice may be used. Other prepared matrices beside silica gel and alumina are available such as those obtained by the dehydration of hydrous metal oxide gels such as those of magnesium, titanium and zinc. Many hydrous oxides do not yield a mechanically stable porous gel structure upon dehydration so it is obvious that these would not be useful for my purpose.

Beside the resinous material included in the above examples numerous other polymerizable resinous materials are available as casting liquids. As instances may be named Polyester resin-acrylic acid with methyl ethyl ketone peroxide initiator;
Styrene monomer with benzoyl peroxide initiator;
The ethyl, propyl, butyl and higher alkyl esters of methacrylic acid; and
Allyl diglycol carbonate with one of the peroxides or isopropyl percarbonate initiator.

Obviously, the selection of the casting liquid is influenced by the physical and chemical properties desired in the cast absorptive body. The cast product must also be relatively inert toward the solvent used for dissolving the matrix. The viscosity of the casting liquid must be sufficiently low so that it may enter completely into the matrix pores before polymerization of the casting liquid causes the viscosity of such liquid to become too high to permit complete saturation of the matrix. While it is possible to employ the casting liquid in solution as indicated by Example III, the effect upon the final matrix body, brought about by evaporation of solvent, must be allowed for. Some of these factors are interrelated. Thus a higher viscosity may be employed for the casting liquid with infusorial earth than with silica gel, since the latter presents a smaller average pore diameter.

Selection of the solvent for dissolving the matrix material also, is subject to extensive selection. However, the choice will be generally subordinated to the previous choices made of matrix material and casting liquid. As pointed out, the solvent must dissolve the matrix material within a reasonable length of time and without injurious action upon the casting liquid.

It will be apparent from the foregoing description that my invention is susceptible of extensive variation within the scope of the description set forth above. My invention is more precisely defined within the terms of the appended claims.

I claim:

1. A self-sustaining cast body of organic resin substantially reproducing the voids of a microcapillary matrix, said voids being of the order of 100 A. and below, the void space of the cast body amounting to 35 to 70% of the total volume of said body.

2. The product of claim 1 wherein the body is cast of a thermosetting resin.

3. The product of claim 1 wherein the body is cast of a polymerizable monomeric casting liquid.

4. The product of claim 3 wherein the resin is of the epoxy type.

5. The product of claim 3 wherein the resin is of the polyester type.

6. The product of claim 3 wherein the resin is of the methacrylic type.

7. A process for forming a microcapillary body which comprises obtaining a microcapillary matrix body, substantially saturating the capillary passages of the matrix with a fluid resin converting the casting fluid in situ to a solid and removing the matrix from the cast solid to leave a cast structure substantially reproducing the voids of the matrix.

8. The process of claim 7 wherein the matrix is removed by means of a solvent for the matrix material, essentially non-reactive toward the casting.

9. The process of claim 7 wherein the matrix is essentially inorganic, and the matrix is removed by means of a reagent which converts the matrix to a non-solid state.

10. The process of claim 7 wherein the matrix is essentially an inorganic oxide.

11. The process of claim 10 wherein the matrix is removed by an aqueous acid.

12. The process of claim 7 wherein the matrix is a silicious material.

13. The process of claim 12 wherein the matrix is removed by aqueous hydrofluoric acid.

14. A process for preparing a microcapillary body of a catalytically promoted thermosetting resin which comprises obtaining a microcapillary matrix consisting essentially of an inorganic oxide, substantially filling the pores thereof with unpolymerized resin containing a promoter of polymerization, effecting setting of the resin and removing the matrix from the resulting body without substantial destruction of the form of the resin body.

15. The process of claim 14 wherein the casting liquid is a polymerizable monomer.

References Cited by the Examiner

UNITED STATES PATENTS

| | | | |
|---|---|---|---|
| 1,113,630 | 10/14 | Hofmann et al. | 260—94.2 |
| 1,935,176 | 11/33 | Connolly | 260—2.5 |
| 2,329,322 | 9/43 | Baty et al. | 260—2.5 |
| 2,739,134 | 3/56 | Parry et al. | 260—2.5 |
| 2,740,743 | 4/56 | Pace | 260—2.5 |
| 2,805,708 | 9/57 | Roche | 260—2.5 |
| 3,007,896 | 11/61 | Clasen | 260—46.5 |

SAMUEL H. BLECH, *Primary Examiner.*

DANIEL ARNOLD, LEON J. BERCOVITZ, *Examiners.*